United States Patent [19]

de Lanauze

[11] 4,153,383
[45] May 8, 1979

[54] WORK PREPARATION AND RULING MACHINE

[76] Inventor: Jacques de Lanauze, Apt. 532, 259 Cypress Rd., Pompano Beach, Fla. 33060

[21] Appl. No.: 848,642

[22] Filed: Nov. 4, 1977

[30] Foreign Application Priority Data

Jan. 11, 1977 [CA] Canada .................. 269433

[51] Int. Cl.$^2$ ............... B23B 41/00; B23B 39/06; B23B 49/00
[52] U.S. Cl. ......................... 408/26; 408/71; 408/89; 33/21 R; 33/189; 29/26 A; 83/425
[58] Field of Search ............... 29/26 A; 408/26, 89, 408/23, 71, 22, 16, 88, 234; 83/425; 33/21 R, 189, 125 M

[56] References Cited

U.S. PATENT DOCUMENTS

| | | | |
|---|---|---|---|
| 1,832,255 | 11/1931 | Springstead | 33/21 R |
| 2,555,313 | 6/1951 | Bowman | 408/234 X |
| 2,898,783 | 8/1959 | Kiesling | 408/88 |
| 3,273,249 | 9/1966 | Klaassen | 33/125 M X |
| 3,292,267 | 12/1966 | Wilterdink et al. | 408/16 X |
| 3,316,648 | 5/1967 | Klaassen | 33/125 M X |
| 3,345,898 | 10/1967 | Dovey | 83/663 |
| 3,438,133 | 4/1969 | Brault | 33/189 X |
| 3,570,351 | 3/1971 | Spengler | 83/425 |
| 3,664,030 | 5/1972 | Pope, Jr. | 33/21 R X |
| 3,696,480 | 10/1972 | Sauer et al. | 29/26 A |

FOREIGN PATENT DOCUMENTS 122841 12/1909 Canada.
904723 7/1972 Canada.

*Primary Examiner*—Horace M. Culver
*Attorney, Agent, or Firm*—Stevens, Davis, Miller & Mosher

[57] ABSTRACT

A work preparation and ruling machine is provided for the production of semi-cylindrical rotary dies. The machine comprises a longitudinal cylinder mounted for rotation in frame and being provided with a series of equally spaced longitudinal rows of holes which are radially formed therein. An end wheel, of the same diameter as a finished die, is coaxially secured to one end of the cylinder and includes a first positioning means whereby the cylinder can be rotated by a distance equal to the distance between each two longitudinal rows of holes. A guide bar mounted above and parallel to the longitudinal axis of the cylinder is provided with a pair of carriages, one carrying drilling and cutting means for drilling holes in the die and for squaring it up and the second carriage includes a pen holding fixture to keep the pen aligned with the axis of the cylinder and includes means for measuring the horizontal dimensions of the layout. The sawing means is swivel mounted to cut vertical and horizontal cuts for the squaring of the wood while making dissections of any length on the cylinder.

1 Claim, 4 Drawing Figures

WORK PREPARATION AND RULING MACHINE

This invention relates to a work preparation and ruling machine for rotary dies, and in particular to a work preparation and ruling machine for semi-cylindrical rotary die boards utilized in the rotary die stamping art.

In the art of die stamping, a semi-cylindrical die board is provided with slots in the surface into which cutting rules are fitted in a predetermined and layed out pattern. The slots usually include both curved and straight slots. At present, there are several means of cutting the slots in the semi-cylindrical die boards but for numerous reasons, the known methods and apparatus for cutting these slots are unsatisfactory. One example of the state of the art is the arrangements wherein a sabre type of saw has a work platen on its lower end which has a surface that is curved to fit the semi-cylindrical surface of the die board. The latter is secured to a frame like member and the saw is then placed on the surface of the board and the pattern laid out on the board is cut by the saw. The main disadvantage of this type of arrangement is that the lower end of the saw blade is free and when the saw is cutting pattern lines that have some curvature, there is a tendency for the saw blade to go off centre somewhat with respect to the projected radial centre line of the slot. In other words, the blade is not precisely radially aligned with the projected central longitudinal axis of the semi-cylindrical board. Accordingly, there is a twisting effect placed upon the cutting rules that are subsequently placed in the die board slots.

Another example of the art is found in U.S. Pat. No. 3,570,351, Spengler of Mar. 15, 1971, in which a saw for machining a curved surface is of the well known jig saw type of lay out, but the work piece support is curved and is both rotatable and also tiltable so that the semi-cylindrical die board placed on the work surface can be moved under the reciprocating saw blade. The disadvantages of this device are that it is always more preferable to have the saw in movement rather than the wood; there are an extremely large number of reciprocating parts and the overall saw layout is large, cumbersome and expensive to manufacture.

The applicant's Canadian Pat. No. 965,333 issued Apr. 1, 1975 discloses a machine for sawing semi-cylindrical die boards by which the drawbacks of the above-mentioned prior art is satisfactorily overcome. The machine comprises a sawing fixture for supporting a semi-cylindrical die board and a saw mounted coaxially with the longitudinal axis of the semi-cylindrical die board and adapted to saw radial slots in the board from the inside thereof.

The semi-cylindrical die board is also provided with holes therethrough for securing the die board to a rotary cylinder of a stamping machine by means of fastening devices such as bolts and nuts. It is said extremely important to drill the holes through the semi-cylindrical die board radially in such a manner that all the holes are accurately aligned with the corresponding holes of the rotary cylinder. If the holes of the semi-cylindrical die board are not radial or are not accurately aligned with the corresponding holes of the rotary cylinder, the securement of the die board is not ensured during the operation thereby reducing the lifetime of the die board.

U.S. Pat. No. 3,696,480 issued to Sauer et al on Oct. 10, 1972 discloses a computer-controlled system for providing a preselected design and accurately applying it to a semi-cylindrical die board for the drilling of spaced holes therein adapted to receive the tangs or legs of the cutting rule. The drilling device in the system is placed in operative positions by the threaded shaft which is coaxial with the semi-cylindrical die board and which is longitudinally spaced from the surface of the semi-cylindrical die board. The rotation of the threaded shaft and the semi-cylindrical die board are controlled by the computer to place the bit of the drilling device in desired positions. However, this system is obviously expensive and the expenditure to the system may not be justifiable for small-scaled production such as rotary die board production for stamping.

The primary object of the present invention is to provide a work preparation and ruling machine for rotary die boards to obtain an extremely high accuracy and precision in the squaring up of the die board and in the accurate drilling of the die board holes. The work preparation and ruling machine of the present invention is compact, easy to use, fast to work, and relatively inexpensive.

In a broad aspect of the present invention, there is provided a work preparation and ruling machine for production of semi-cylindrical rotary dies, comprising: a frame; a cylinder adapted to detachably receive the rotary die thereon, said cylinder being rotatably mounted in the frame and being provided with a plurality of equally spaced longitudinal rows of holes, the holes being radially formed in the surface of the cylinder relative to the central longitudinal axis thereof thereby forming a plurality of equally spaced radial rows of the spaced holes; a wheel coaxially integral to the cylinder and provided with a positioning means to rotate the cylinder by a distance equal to the distance between each two adjacent longitudinal rows of the spaced holes; a guide bar mounted in the frame, said guide bar being spaced from and parallel with the central longitudinal axis of the cylinder, said guide bar being equipped with a plurality of positioning recesses in a longitudinal surface thereof, said recesses being spaced from each other by the distance between each two adjacent radial rows of the spaced holes of the cylinder; and a first carriage slidably mounted on the guide bar, said first carriage being equipped with a first stopper means adapted to engage the positioning recesses of the guide bar and a drilling means perpendicularly movable to the surface of the cylinder between an inoperative position and an operative position, said drilling means being mounted on the first carriage in such a manner that the bit of the drilling means is perpendicular to the surface of the cylinder and is aligned with the corresponding hole when both the wheel and the first carriage are positioned.

The invention will be described below by way of example with reference to the accompanying drawings wherein.

Figure 1:
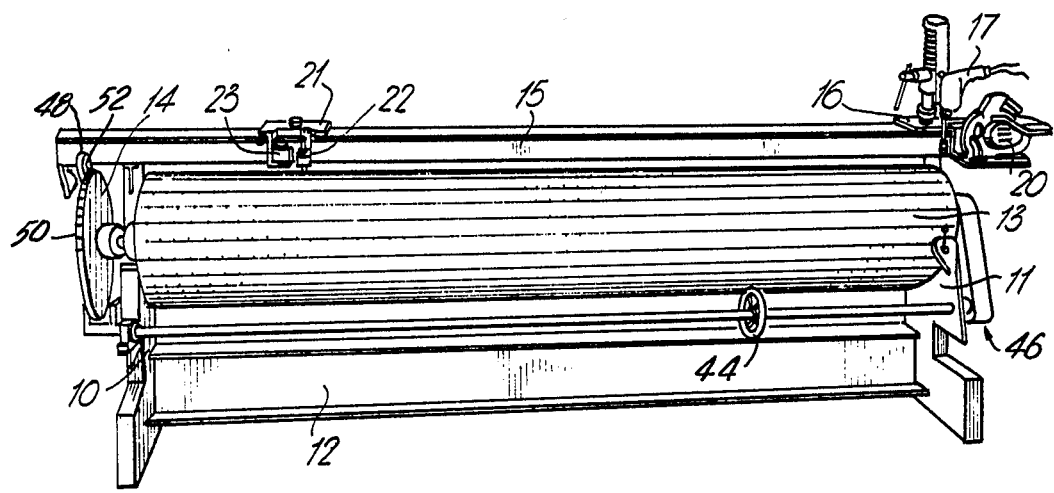
FIG. 1 is a front perspective view of the work preparation and ruling machine of an embodiment according to the present invention.
Figure 3:
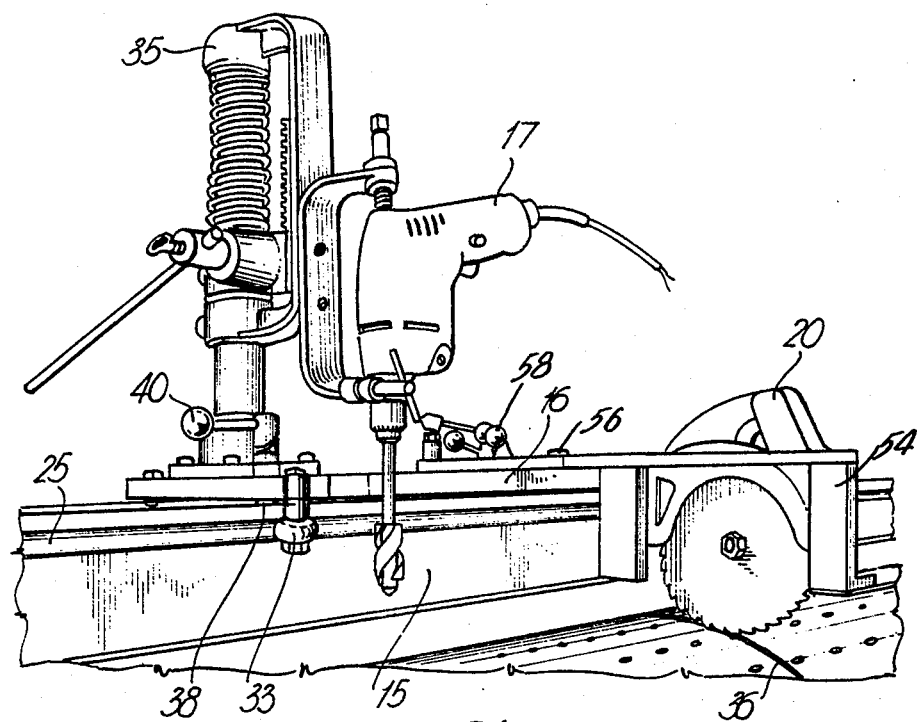
Figure 4:
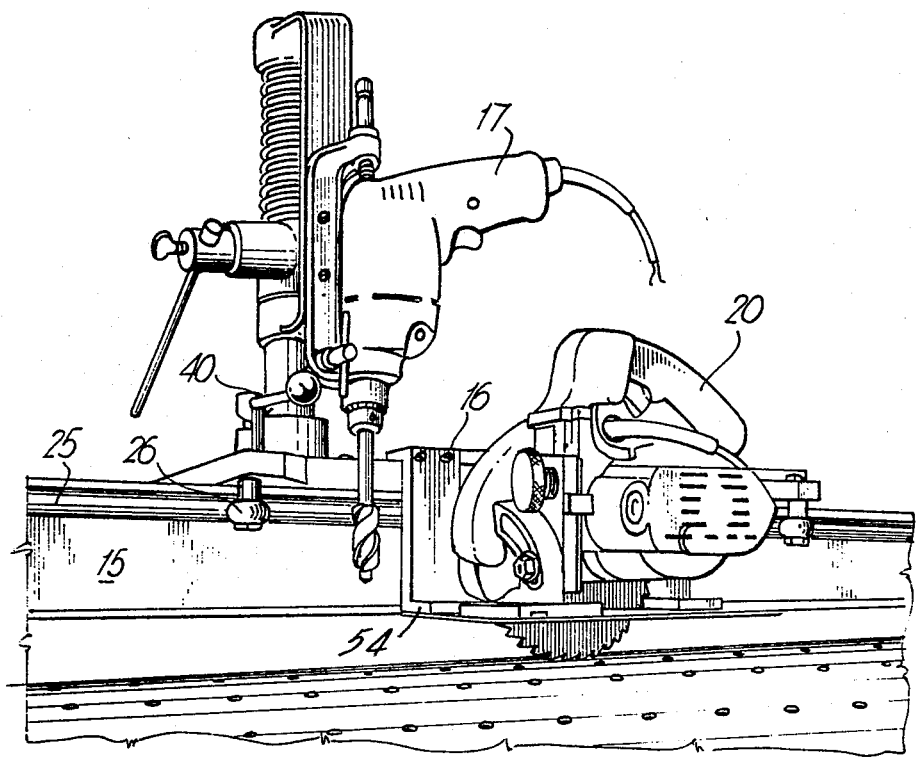

FIG. 3 is a partial perspective view of the machine in FIG. 1 showing in detail the drill and circular saw carriage in which the circular saw is in operation to cut a radial groove in the surface of the semi-cylindrical die board; and FIG. 4 is a partial perspective view of the machine as in FIG. 3 in which the circular saw is in operation to cut a longitudinal groove in the surface of the semi-cylindrical die board.

Referring to FIG. 1, the work preparation and ruling machine consists of a frame made of a pair of end uprights 10, 11 interconnected by an I-beam 12. Rotatably supported by the uprights is a cylinder 13 which is adapted to detachably receive a semi-cylindrical die board. The cylinder has an end wheel 14 coaxially mounted thereon and being the same diameter as the die board. The wheel is located outside of the upright 10. A guide bar 15, parallel to the cylinder 13 and spaced from the top surface of the cylinder, is mounted on the uprights 10, 11. Slidably mounted on the guide bar 15 is a first carriage 16 equipped with a drill 17 and a circular saw 20 and a second carriage 21 equipped with a ruling pen 22 and a digital "Trav-a-dial" (trademark) measuring device to measure longitudinal dimensions of the layout within accuracy deviations of ±0.0005" (0.0127 mm).

Figure 2:
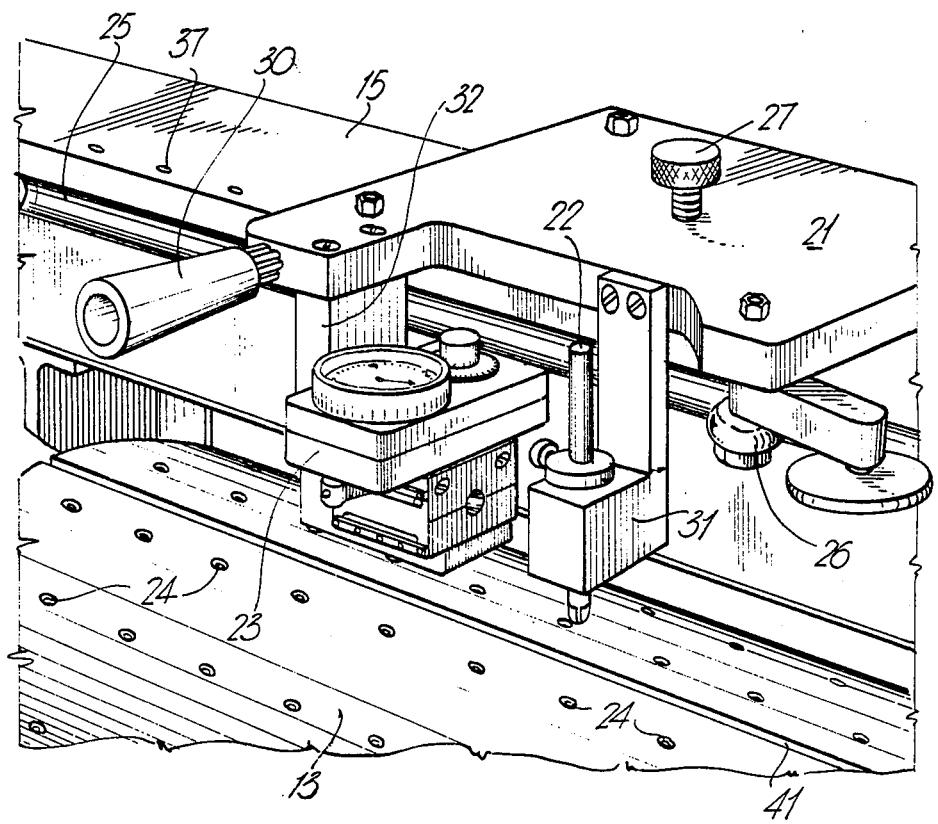
FIG. 2 is a partial perspective view of the machine showing in detail the travelling ruler carriage in FIG. 1.

Turning now to FIG. 2, there is illustrated in detail the second carriage 21. The cylinder 13 is provided with a plurality of equally spaced longitudinal rows of holes 24, said holes being also radially formed in the surface of the cylinder relative to the central longitudinal axis thereof thereby forming a plurality of equally spaced radial rows of the spaced holes. The guide bar 15 is provided with a pair of longitudinal grooves 25 in the front and rear longitudinal vertical walls thereof. The second carriage is slidably mounted on the guide bar 15 by means of followers 26 which rotatably travel in the grooves 25. The second carriage 21 is provided with a stopper 27 to secure the second carriage at the left end of the guide bar when the ruling pen is not in use.

A handle 30 is also provided with the second carriage for easier handling thereof. The ruling pen 22 is vertically movably held by a holding fixture 31. The pen holding fixture 31 is designed to keep the pen aligned with the axis of the cylinder to prevent the breakage of the pen point when moving over wood joints and to adjust automatically to any thickness of die boards. The digital "Trav-a-dial" 23 is also mounted on the carriage 21 by means of a holder 32. The digital "Trav-a-dial" is actuated by sliding against the adjacent vertical wall of the guide bar 15.

In FIGS. 3 and 4, there are illustrated in detail both the drill 17 and the circular saw 20 mounted on the first carriage 16. A follower 33 rotatably travels in the groove 25 for the slidable movement of the carriage. The guide bar is provided with equally spaced positioning recesses 37 (see FIG. 2) along the longitudinal front, top edge of the guide bar. The first carriage 16 is also equipped with a locking pin 38 and actuating handle 40 which engages any desired recess 37 in the guide bar 15 to direct the bit of the drill 17 onto the corresponding hole of the cylinder so as to drill a hole through the surface of the semi-cylindrical rotary die, not shown, detachably received on the cylinder with accurate alignment with the holes. The drill 17 is brought into operation by a rack and pinion arrangement 35.

The first carriage is also equipped with a circular saw 20 which is in swivable operative positions in FIGS. 3 and 4. Circular saw 20 and its support platform 54 are pivotally mounted as at 56 to the carriage 16 and can be locked in either FIG. 3 or FIG. 4 positions by suitable locking means 58. In FIG. 3 the circular saw 20 is operatively positioned for cutting in a radial peripheral groove 36 in the surface of the cylinder 13 so as to "square" the end of a semi-cylindrical rotary die. In FIG. 4, the saw 20 has been counterclockwise rotated by 90 degrees so that the saw is positioned for cutting in a longitudinal groove 41 of the cylinder 13 (FIG. 2). The groove 41 being parallel to the longitudinal axis of the cylinder 13 and thereby to "square" up the long sides of the semi-cylindrical rotary die board. The semi-cylindrical rotary die (and the cylinder) are rotated by means of a hand wheel 44 and suitable gearing 46. The end wheel 14 actuates another digital "Trav-a-dial" 48 mounted on the guide bar 15 to measure vertical dimensions. The end wheel 14 may be provided, at the peripheral surface thereof with a set of positioning recesses 50 which engage a stopper 52 mounted on the upright 10 or guide bar 15. The positioning recesses on the wheel are useful to align the longitudinal rows of the recessed holes in the cylinder with the bit of the drill. The end wheel is rotatable with any desired distances by the aid of the digital "Trav-a-dial" mounted on the guide bar or the frame.

In a physical example, the cylinder 13 is 19 3/16 inches in diameter, while the wheel 14 is 22 1/16 or 22 3/16 inches in diameter, the diameter of the finished die.

I claim:

1. A work preparation and ruling machine for production of semi-cylindrical rotary dies, comprising:

a frame;

a cylinder adapted to detachably receive the rotary die thereon, said cylinder being rotatably mounted in the frame and being provided with a plurality of equally spaced longitudinal rows of holes, the holes being radially formed in the surface of the cylinder relative to the central longitudinal axis thereof thereby forming a plurality of equally spaced radial rows of the spaced holes;

an end wheel coaxially secured to one end of the cylinder and provided with a first positioning means whereby the cylinder can be rotated by a distance equal to the distance between each two adjacent longitudinal rows of the spaced holes said end wheel having the same diameter as that of a finished die; said first positioning means including a second stopper mounted on the guide bar and a set of equally spaced recesses provided in a peripheral surface of the end wheel;

a guide bar mounted in the frame, said guide bar being spaced above the cylinder and parallel with the central longitudinal axis of the cylinder, said guide bar being equipped with a plurality of positioning recesses in a longitudinal surface thereof, said recesses being spaced from each other by the distance between each two adjacent radial rows of the spaced holes of the cylinder;

a first carriage slidably mounted on the guide bar, said first carriage being equipped with a first stopper means adapted to engage the positioning recesses of the guide bar and including a drilling means perpendicularly movable to the surface of the cylinder between an inoperative position and an operative position, said drilling means being mounted on the first carriage in such a manner that the bit of the drilling means is perpendicular to the surface of the cylinder and is aligned with the corresponding hole when both the wheel and the first carriage are positioned; said guide bar being provided with a first digital distance measuring device which is actuated by the end wheel; said first carriage being equipped with a die cutting means which is rotatable between parallel and perpendicular cutting positions to the guide bar and which is perpendicularly movable between an inoperative position and an operative position;

a second carriage slidably mounted on said guide bar, said second carriage being equipped with a tracing means adapted to rule the surface of the rotary die board on the cylinder and including a second digital distance device which is actuated by the guide bar; and a second wheel mounted on a shaft parallel to said cylinder and interconnected thereto for rotating the same.

* * * * *